May 9, 1939.　　　　R. S. JACOBSEN　　　　2,157,758
CHANGE SPEED TRANSMISSION
Filed May 20, 1937　　　　2 Sheets-Sheet 1
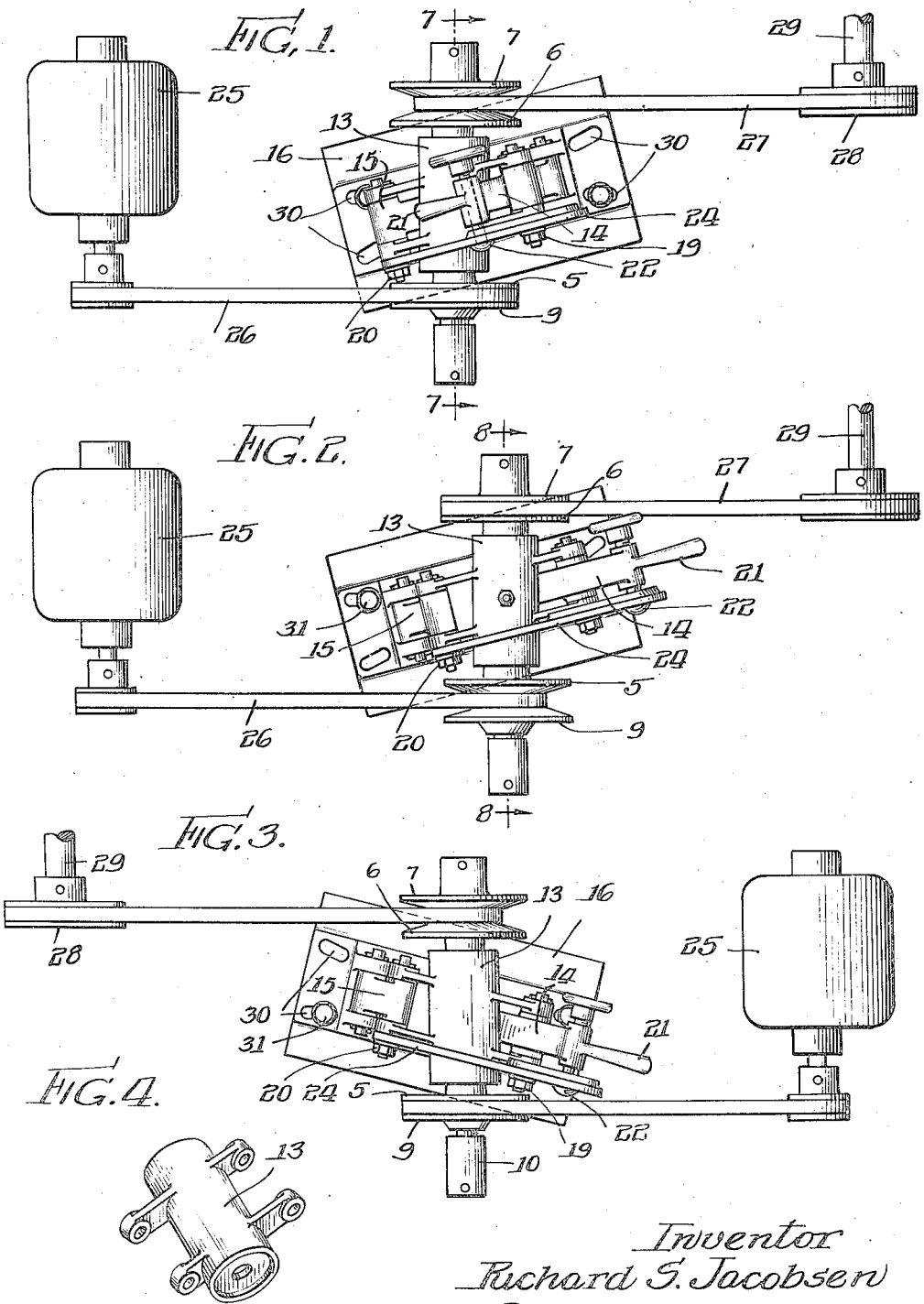
Inventor
Richard S. Jacobsen
By: Arthur F. Durand
atty.

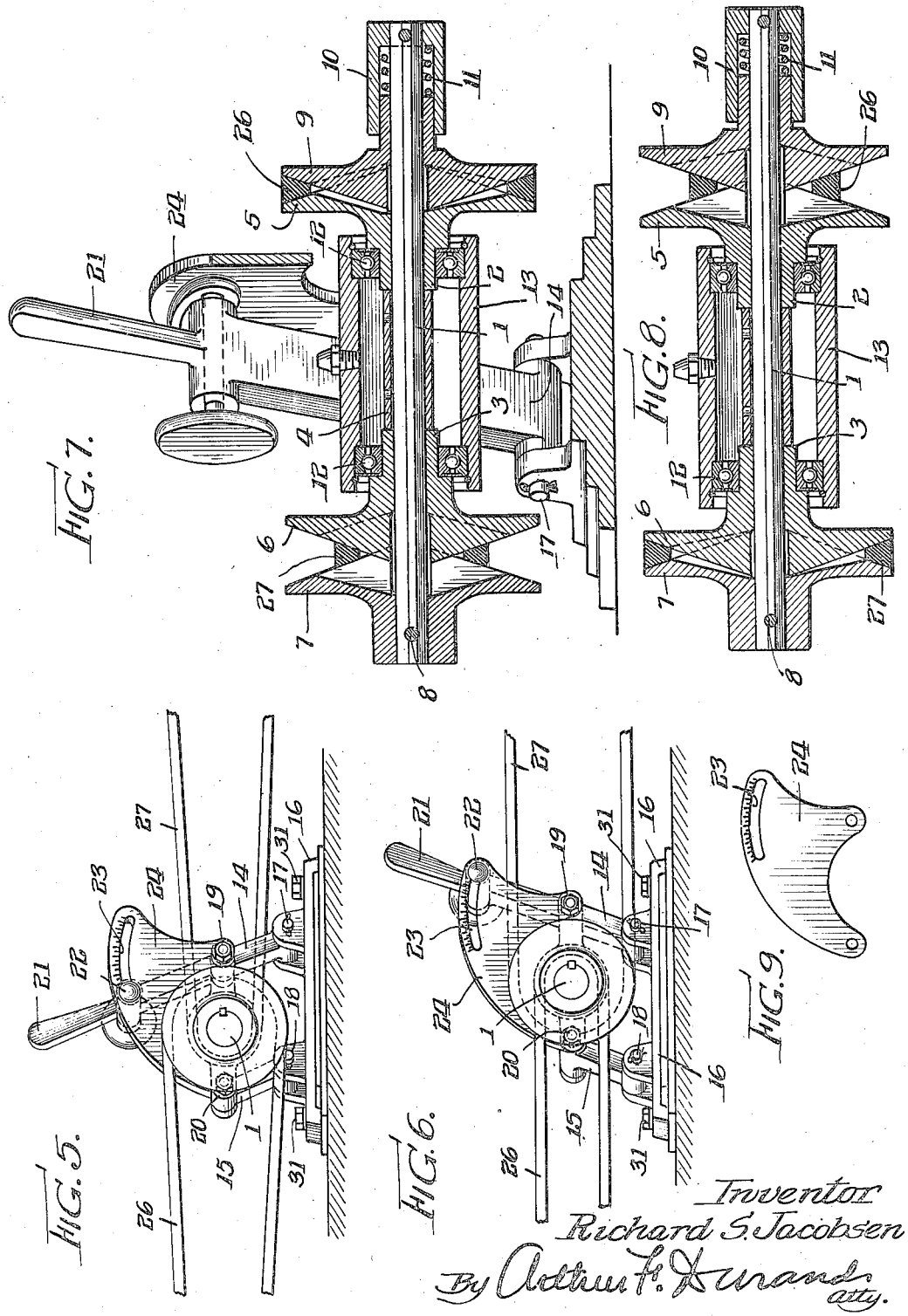

Patented May 9, 1939

2,157,758

UNITED STATES PATENT OFFICE 2,157,758

CHANGE SPEED TRANSMISSION

Richard S. Jacobsen, Wheaton, Ill.

Application May 20, 1937, Serial No. 143,713

5 Claims. (Cl. 74—230.17)

This invention relates to change speed transmission, and more particularly to transmission of that type in which sectional V-pulleys and V-belts are employed, to vary the speed of the output, for any known or desired purpose.

Generally stated, the object of the invention is to provide a novel and improved construction and arrangement whereby sectional V-pulleys, and V-belts, are employed in combination with a pulley shaft which is movable laterally, to change the speed of transmission, such lateral displacement of the shaft being about an axis or axes oblique to the fixed plane or planes of the V-belt or belts, as well as oblique to the axis of the shaft itself, whereby, in effect, the shaft has some endwise displacement, when moved laterally in either direction, thereby to maintain the belt or belts in the fixed plane or planes thereof.

To the foregoing and other useful ends, the invention consists in matters hereinafter set forth and claimed and shown in the accompanying drawings, in which:

Fig. 1 is a plan view of a variable speed transmission embodying the principles of the invention.

Fig. 2 is a similar view showing the parts in different positions.

Fig. 3 shows the transmission reversed for transmission in the opposite direction from what is shown in Figs. 1 and 2 of the drawings.

Fig. 4 is a perspective of one of the parts of the said transmission.

Fig. 5 is a side elevation of said transmission, showing the parts in positions in which they are shown in Fig. 1 of the drawings.

Fig. 6 is a similar view, showing the parts in the positions in which they are shown in Fig. 2 of the drawings.

Fig. 7 is an enlarged axial section on line 7—7 of Fig. 1 of the drawings.

Fig. 8 is a similar axial section on line 8—8 in Fig. 2 of the drawings.

Fig. 9 is a detail side elevation of a part of said transmission.

As thus illustrated, the invention comprises a rotary shaft 1, preferably horizontally disposed, and supported in sleeves 2 and 3, with a spacing sleeve 4 between them, the sleeve 2 being integral with a pulley section 5, and the sleeve 3 being integral with a pulley section 6, as shown more clearly in Figs. 7 and 8 of the drawings. The pulley section 7, that cooperates with the section 6, is keyed at 8 on the said shaft; and the pulley section 9, that co-operates with the section 5, is splined on the said shaft, and this spline runs through the sleeves 2 and 3 as well. In this way, everything is splined on the shaft and the section 7 and the end cap or sleeve 10, are fixed or pinned on the shaft, which cap contains a coil spring 11, that normally bears against the hub portion of the section 9, so that the pulley sections are normally under spring action to close them together. The sleeves 2 and 3 rotate in bearings 12, of any suitable character, carried in the end portions of the cylindrical housing or barrel 13, which latter is carried on the arms 14 and 15 that are pivoted on the base 16 at 17 and 18, and which have their upper ends pivoted on the said barrel at 19 and 20. The housing 13 may contain a lubricant.

Looking at Figs. 1 to 3 inclusive, it will be seen that the said base 16 is skewed, instead of being at right angles to the said shaft 1, and that the axes provided by the pivots 17, 18, 19 and 20 are parallel and transverse of the length of this base, and hence are oblique to the axis of the said shaft. A hand-lever 21 is rigid with the link or arm 14 previously mentioned, and is provided with a locking bolt 22 adapted to travel in the curved slot 23 of the segment plate 24, which latter is mounted on the pivots 19 and 20 previously mentioned. With this lever, therefore, the shaft and its sectional pulleys can be moved laterally, not in the direction at right angles to the axis of the shaft, but on a line oblique to said axis, when the transmission is viewed from above.

In Figs. 1 and 2 of the drawings, an electric motor 25 is connected by a V-belt 26 with a V-pulley formed by the sections 5 and 9 previously mentioned. Also, a similar V-belt 27 connects the V-pulley formed by the sections 6 and 7 with the power output pulley 28, which latter may be on a shaft 29 of any suitable character. When the sections 6 and 7 are apart, as shown in Fig. 1, and the sections 5 and 9 are together, as shown in this figure, the transmission from the motor 25 to the shaft 29 is at a certain rate of speed. When the handle 21 is in the position shown in Fig. 2 of the drawings, the pulley sections 5 and 9 are apart, and the sections 6 and 7 are together, and consequently the transmission of power from the motor 25 to the output shaft 29 is at a different rate of speed. Thus, there is an indefinite number of speeds between the two extreme positions of the handle 21, brought about by the action of the said V-pulleys, which, in effect, is a change in diameter, as each pulley is, in effect, of less diameter when its sections are apart, and of greater diameter when its sections are together.

It will be seen that the base 16 is provided with four slots 30, arranged at angles converging to the center of the base. When the base is turned or skewed in the manner shown in Fig. 1, two of the slots 30 are employed with holding bolts 31 to fasten the base in place on a solid support. At such time, these two slots and their accompanying bolts are on a line at right angles to the axis of the pulley shaft 1, when the transmission is viewed from above. However, when it is desired to change from a right to a left, so to speak, then the base 16 is turned or skewed in the opposite direction, as shown in Fig. 3 of the drawings, thus bringing the other slots and their bolts on a line at right angles to the pulley shaft 1, when the transmission is viewed from above. This also requires that the housing 13 be reversed or turned upside down, to give it a different angle on the base.

If the shaft 21 was mounted to move laterally, without any accompanying endwise displacement, it will be seen that the belts 26 and 27 would not remain in their fixed vertical planes, due to the bevel formation of the pulleys. However, by skewing the shaft relatively to the length of the base 16, and relatively to the axes 17, 18, 19 and 20, about which the shaft is movable, there is more or less endwise displacement of the shaft, when it is moved laterally, because the displacement of the shaft is not on a line parallel with the said belts, and at right angles to the axis of the shaft 1, when the transmission is viewed from above. To the contrary, the lateral displacement of the shaft is on a line oblique to the belts, and oblique to the said axis of the shaft, when the transmission is viewed from above. In this way, there is sufficient compensating endwise displacement of the shaft to keep the two belts in their fixed vertical planes, which is highly desirable, as in order to insure the best results, the belts must be kept in their fixed vertical planes in order to run properly on the pulleys.

Thus it will be seen that the pulley sections 5 and 6 react against each other through the spacer 4, and that in this way axial thrust on the ball bearings is eliminated. In addition, it will be seen that the bearings are between the two pulleys, so that the latter are outside on the overhanging end portions of the shaft 1, and in this way the belts are very easily slipped on and off the pulleys, without the necessity of removing or disturbing any of the parts of the mechanism. Again, it will be seen that any lubricant in the housing 13 serves to lubricate all bearings that need lubrication, and it will be understood that any suitable means, such as the plug shown in the top of this housing, can be used for opening and closing the housing when it is to be filled with oil, grease, or other suitable lubricant.

Thus it will be seen that the link means 14 and 15 provide a plurality of parallel pivotal axes which are parallel, but which are disposed at an angle to the axis of the shaft 1 of the said mechanism, and that these parallel pivotal axes are thus disposed in position to permit some endwise movement of the shaft, when the latter is moved laterally.

It will be seen that the axis of the shaft 1, when the latter is moved or displaced laterally, travels on the arc of a circle, in opposite directions, when the shaft is displaced one way or the other, thereby to change the speed of transmission. In addition, there are means of adjustment for reversing the angle of the oblique pivotal axes provided by the pivots 17, 18, 19, and 20, when it is desired to reverse the direction of transmission to and from the shaft.

What I claim as my invention is:

1. In a change speed power transmission, the combination of a base, a sleeve, axially spaced bearings secured in said sleeve, a shaft passing through and slidable relative to said bearings, a pair of relatively movable inside and outside pulley sections mounted on each end of said shaft forming a pair of expansible pulleys, one of said inside pulley sections of each pair of pulleys being secured to said bearings, the remaining pulley section of one pulley being secured to the shaft, means connecting the remaining pulley section of the other pulley for limited axial movement on said shaft, supporting links pivoted on said base and on said sleeve, providing a plurality of pivotal axes which are parallel with each other but which are oblique to the axis of said shaft, means including belts serving to expand one pulley while the other is contracted, controlling means for displacing said sleeve with respect to said base, whereby relative axial motion of said sleeve and said shaft is produced thereby contracting one pulley and expanding the other and producing a change of speed while said belts are maintained substantially in fixed parallel planes.

2. A structure as specified in claim 1, the inside sections of the pulleys and one outside section being splined on said shaft, the other outside section being fixed on one end of said shaft, a shoulder on the other end of the shaft, and a coil spring between said shoulder and said splined outside section, tending to keep both pulleys contracted.

3. A structure as specified in claim 1, said pulleys having their inside sections journaled in the ends of said sleeve, and a spacer sleeve on said shaft between the inner ends of said inside sections.

4. A structure as specified in claim 1, said controlling means comprising a handle rigid with the upper end of one of said links, and means for holding said handle in any adjusted position thereof.

5. A structure as specified in claim 1, comprising means of adjustment for reversing the angle of said oblique axes, when it is desired to reverse the direction of transmission to and from said shaft.

RICHARD S. JACOBSEN.